United States Patent [19]

Court et al.

[11] Patent Number: 5,924,354
[45] Date of Patent: Jul. 20, 1999

[54] INFUSION CONTAINER

[75] Inventors: Nigel Timothy Court; Alastair Guy Linden Kingsland; Brian Douglas Smith, all of London, United Kingdom

[73] Assignee: Tetley GB Limited, London, United Kingdom

[21] Appl. No.: 08/983,213

[22] PCT Filed: Jul. 3, 1996

[86] PCT No.: PCT/GB96/01598

§ 371 Date: Jun. 1, 1998

§ 102(e) Date: Jun. 1, 1998

[87] PCT Pub. No.: WO97/01981

PCT Pub. Date: Jan. 23, 1997

[30] Foreign Application Priority Data

Jul. 4, 1995 [GB] United Kingdom .................. 9513572

[51] Int. Cl.⁶ .................................................. A47J 31/20
[52] U.S. Cl. .................................. 99/318; 99/322; 99/323
[58] Field of Search .......................... 99/318, 322, 323, 99/285

[56] References Cited

U.S. PATENT DOCUMENTS

| | | | |
|---|---|---|---|
| 2,099,996 | 11/1937 | Beling | 99/318 |
| 3,217,923 | 11/1965 | Price | 99/285 X |
| 3,517,604 | 6/1970 | Coors . | |
| 4,181,071 | 1/1980 | Outlaw . | |
| 4,785,723 | 11/1988 | Sheen . | |
| 4,996,086 | 2/1991 | Gerlowski et al. | 427/421 |

FOREIGN PATENT DOCUMENTS

| | | | |
|---|---|---|---|
| 569 435 | 1/1995 | European Pat. Off. . | |
| 380523 | 10/1923 | Germany | 99/318 |
| 1 804 425 | 5/1970 | Germany . | |
| 24 07221 | 8/1975 | Germany . | |
| 24 14 669 | 8/1975 | Germany . | |
| 31 12 231 | 10/1982 | Germany . | |
| 37 40 397 | 8/1989 | Germany . | |
| 41 24 993 | 7/1992 | Germany . | |
| 11519 | 6/1894 | United Kingdom | 99/318 |
| 297244 | 9/1928 | United Kingdom | 99/318 |
| 348572 | 5/1931 | United Kingdom . | |
| 369323 | 3/1932 | United Kingdom . | |
| 369823 | 3/1932 | United Kingdom . | |
| 684177 | 10/1952 | United Kingdom . | |
| 825639 | 12/1959 | United Kingdom . | |
| 854867 | 11/1960 | United Kingdom . | |
| 2028675 | 3/1980 | United Kingdom . | |
| 2282059 | 3/1995 | United Kingdom . | |
| WO80/01037 | 5/1980 | WIPO . | |

*Primary Examiner*—Reginald L. Alexander
*Attorney, Agent, or Firm*—Alix, Yale & Ristas, LLP

[57] ABSTRACT

An infusion container having an interior receiving a liquid to be infused and an infusible substance. Mounted to the container is a pivotal member which cooperates with a baffle means to define a region in the container which receives the infusible substance. Both the pivotal member and baffle means are adapted to permit passage of the infusing liquid, but not of the infusible substance. In use, the pivotal member can be pivoted through the interior by moving handle, to lift the infusible substance out of the infusing liquid to halt the infusion process at the desired time.

27 Claims, 5 Drawing Sheets

INFUSION CONTAINER

The present invention relates to a container, such as a teapot, for infusing an infusible substance, and in particular to such a container in which the infusible substance may be isolated from the infusing liquid to stop infusion after a given period of time.

When infusing substances such as tea or coffee in a liquid, such as hot water, it is usually desirable to be able to stop further infusion once the infusion has reached the required strength. This can be achieved by removing either the infused liquid or the infusible substance from the container in which infusion occurs, but this is not always practical. Thus the infused liquid is often left in contact with the infusible substance after the desired infusion strength has been reached, such that any remaining liquid is then infused too strongly.

A number of containers for infusing liquids have therefore been developed in which the liquid and infusible substance can be isolated one from another in the same container in use, whereby infusion may be stopped without the need to remove either component from the container.

Ideally such containers would be relatively easy and inexpensive to produce, simple and effective to use and sufficiently robust to withstand the repeated, frequent use to which they are likely to be subjected.

One such container is described in EP-B-0569435. That container has a filter insert including a plunger which can be depressed to isolate the infusible substance from the liquid when it is desired to stop infusion. However, it is a relatively complex and thus expensive mechanical arrangement and, furthermore, prior to use the plunger shaft stands proud of the container, which is both ungainly and potentially exposed to being knocked over accidentally. Other prior art containers similarly suffer from drawbacks.

There is a demand for an improved container of the type discussed and it is therefore an object of the present invention to provide an alternative, improved such container, which is particularly, but not exclusively, suited to infusing infusion bags, such as tea and coffee bags.

According to a first aspect of the present invention, there is provided an infusion container for receiving an infusing liquid and an infusible substance, and having a pivotal member mounted to the container and pivotable by a user to move through at least part of the interior of the container in such a way as to substantially isolate the infusible substance from the infusing liquid.

The present invention uses a pivotal member to isolate the infusible substance from the liquid and thereby halt the infusion process at a time chosen by the user. This is a mechanically simple arrangement which can isolate the infusible substance from the liquid for all liquid levels in the container up to the normal maximum fill level. A pivotal arrangement can be sufficiently robust to withstand repeated use and does not require any complex (and thus expensive) components which might be more susceptible to damage and wear and tear. Such an arrangement is also more compact than a linearly moving plunger, for example, and thus does not affect substantially the external dimensions of the container during use.

Although the pivotal member can take any suitable form and have any suitable pivotal arrangement, it is preferably generally in the form of a paddle having a single pivot near or at one end thereof. The pivotal member can then extend from that pivot into the container's interior. This arrangement achieves the necessary pivotal action and is of a shape suitable to strain solids from a liquid, without any unnecessary complexity.

The pivotal member is preferably coupled to a handle operable by a user to pivot the pivotal member. The handle and pivotal member may be integral with the handle extending externally of the container, beyond the pivotal mounting of the pivotal member. In this way pivotal motion of the handle can be directly translated to pivotal motion of the pivotal member without any further moving parts. A handle which extends externally of the container can be operated without the need to open the container.

The handle of the pivotal member is preferably positioned close to the main handle, if any, of the container, such that both handles can be used simultaneously with the same hand.

In one embodiment the container is provided with a pivotally mounted lid, and the lid and pivotal member are arranged to pivot about the same axis and have a common mounting means. This means that only one pivot arrangement need be provided in the container. In this case, the lid and pivotal member are preferably arranged to be pivotal independently of one another.

The pivotal member is preferably arranged to move through substantially the entirety of the region in the container in which the infusible substance is received, so as to ensure that the pivotal member isolates substantially all of the infusible substance from the infusing liquid when operated. The pivotal member and container interior walls can be appropriately shaped to achieve this, but this places constraints on the design of the container. It is therefore much preferred to provide baffle means within the container which cooperates with the pivotal member to define a region in the container's interior which receives the infusible substance in use and through substantially the entirety of which the pivotal member moves when operated. The baffle means can, for example, be positioned sufficiently close to the pivotal member such that the infusible substance cannot pass between them and can be shaped so as to follow the arc traced by the distal end of the pivotal member. This ensures that the infusible substance remains in the region bounded by the pivotal member and baffle means.

The pivotal member and baffle means, if any, should be of a form which permits passage of the infusing liquid, but not of the infusible substance, such as, for example, fine meshed sieves. If infusing solely infusion bags such as tea and coffee bags and the like, the pivotal member and baffle means can have larger openings of any desired shape, e.g. circular, but which openings are still small enough to prevent passage of an infusion bag. In a particularly preferred such embodiment, they comprise a plurality of spaced-apart bars.

The pivotal member can be arranged to isolate the infusible substance by sealing it in a liquid-tight manner e.g. against an interior wall of the container but is most preferably arranged to lift the infusible substance out of the infusing liquid.

The pivotal member is thus preferably arranged to pivot between a first position in which it depends towards the base of the container to permit infusion and a second, operated position in which it lies substantially horizontally above the normal maximum level of the liquid (which level can readily be indicated by a maximum liquid fill mark in the container).

The pivotal member is preferably arranged to remain in its operated position once moved to that position by a user, for example by engaging a suitably positioned catch or clip on the container, or by a friction fit with part of the container. In a particularly preferred embodiment the pivotal member is arranged to engage a clip on the lid of the container.

The pivotal member preferably also returns of its own accord to the first position unless operated. Most preferably, the pivotal member is arranged to return automatically to its first, unoperated position ready for use whenever the lid is opened. This can be achieved, for example, by arranging the clip on the lid of the container to disengage when the lid is opened such that the pivotal member is released.

The container preferably is transparent or has a transparent portion which permits observation of the infusing liquid during infusion. This enables the infusing liquid to be seen easily without opening the lid or pouring any liquid, such that a user can readily halt infusion when the infusion is observed to have reached the desired strength.

The transparent portion of the container can be made of any suitable transparent material such as a transparent polymer. In a particularly preferred embodiment the transparent portion is made of amorphous nylon. This is a sufficiently robust material which is chemical resistant and will remain clear even after repeated washing. An alternative material having similar advantages is methyl-pentene copolymer.

The above materials are advantageous for use in transparent infusion containers generally and thus according to a second aspect of the present invention, there is provided an infusion container for receiving an infusing liquid and an infusible substance, wherein at least a portion of the container is transparent and the transparent portion comprises amorphous nylon or methyl-pentene copolymer.

Although the present invention is particularly suited to containers such as tea pots and coffee pots for infusing infusible substances in the form of infusion bags, such as tea and coffee bags, it is equally applicable to other forms of infusible substance such as tea leaves or coffee grounds, and other types of infusion containers.

A preferred embodiment of the present invention will now be described by way of example only, and with reference to the accompanying drawings, in which:-

Figure 1:
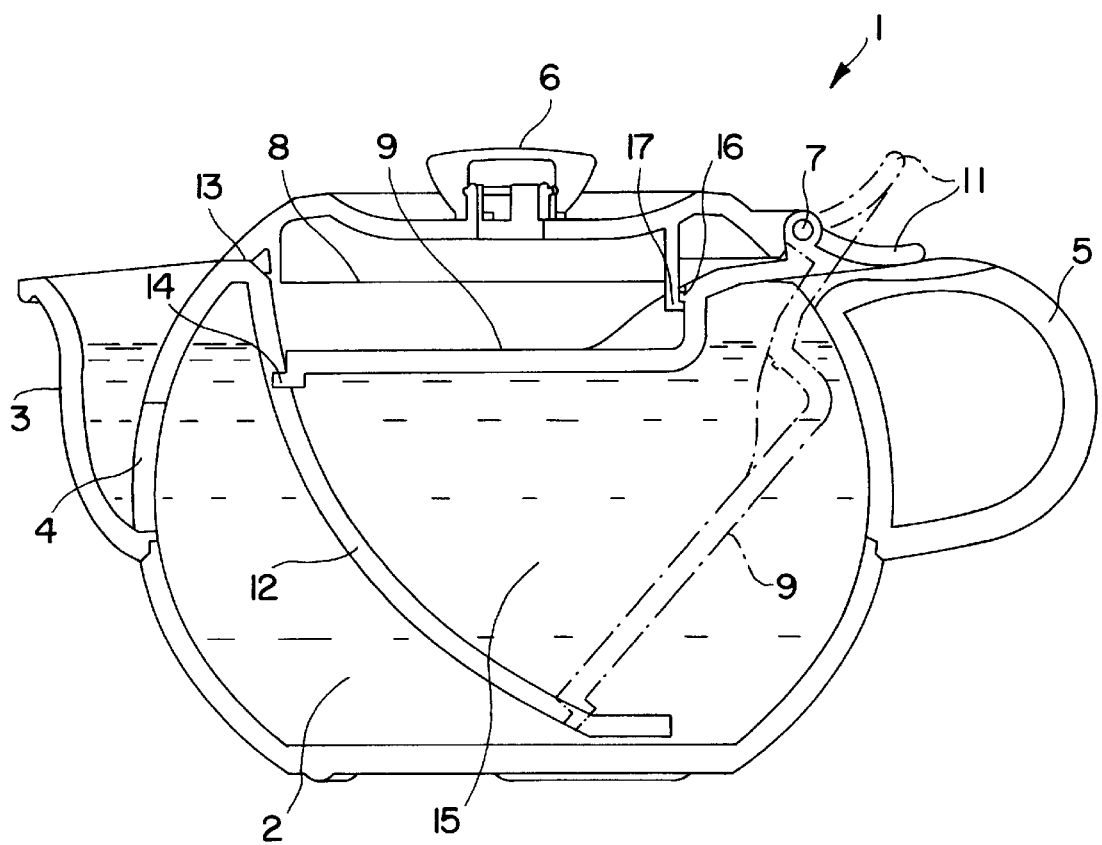
FIG. 1 shows a cross-sectional side view of the infusion container of the present invention.

In FIG. 1 the container 1 of the present invention is shown as a tea pot. However, the invention is equally applicable to other forms of infusion container, as noted previously.

The container 1 receives in its interior 2 the liquid to be infused and the infusible substance. A spout 3 for pouring the liquid from the container 1 communicates via an opening 4 with the interior 2. A main handle 5 is provided for lifting and pouring the container.

The container 1 also has a lid 6 which is pivotally mounted about a rod 7 located near the handle 5 of the container 1 to enable it to be opened and closed. The lid 6 closes the top opening 8 of the container 1 and when opened permits filling of the container 1 with infusible substance and infusing liquid. The lid engages a catch 13 to prevent it from opening accidentally.

The container 1 has a pivotal member 9 which is pivotally mounted towards one end thereof on the rod 7 (which also mounts the lid 8). The lid 6 and pivotal member 9 are arranged to pivot independently of each other about the rod 7.

Figure 2:
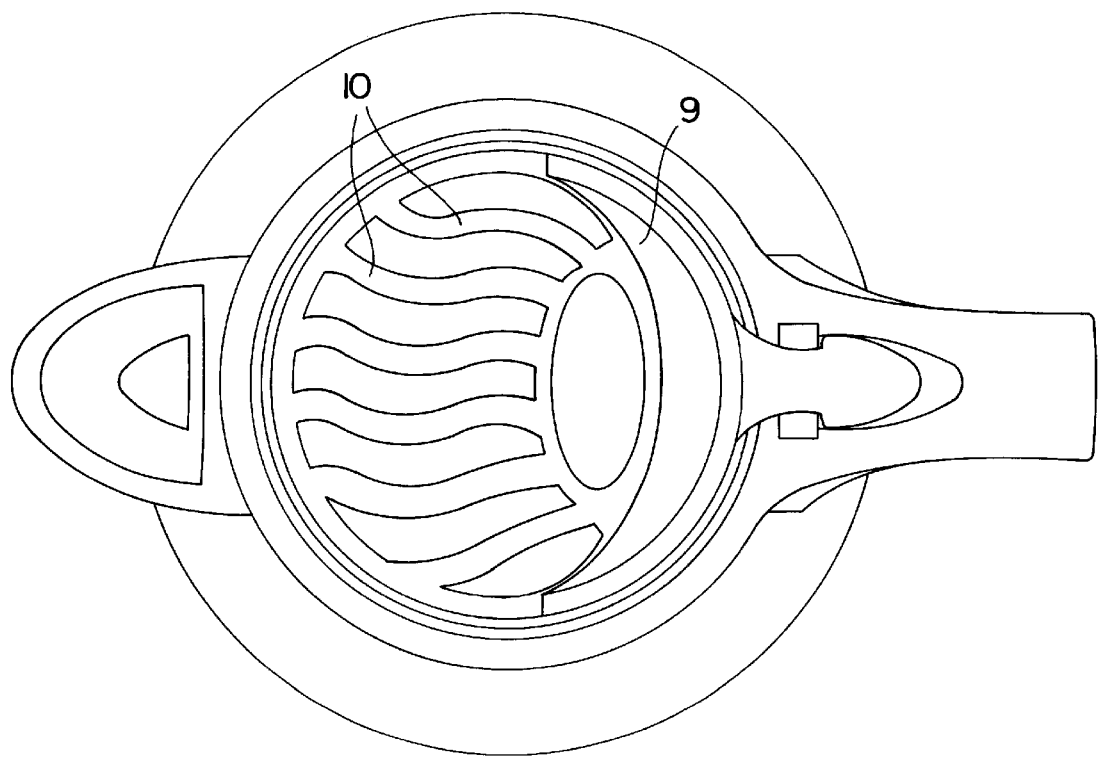
FIG. 2 shows a top view of the container of the present invention.

The pivotal member 9 is planar in form and has a plurality of spaced apart bars 10 which extend into the interior 2 (see FIG. 2). The bars are spaced apart such that they permit flow of liquid therebetween, but prevent an infusion bag, such as a tea bag, from passing between them.

The other end of the pivotal member has a handle 11 integrally formed therewith, which handle can be operated by a user to pivot the pivotal member 9 about the rod 7 to move it between a first position as shown in dashed outline and a second, operated position, in which it lies substantially horizontally, as shown in solid outline.

A maximum liquid fill mark can be provided on the container at a level below the level of the pivotal member when in its horizontal position, to enable a user to ensure that the container is not filled to a level at which the pivotal member will not work to halt infusion.

The container also has a baffle means 12 which comprises a plurality of spaced apart bars. The bars are so spaced as to permit passage of infusing liquid therebetween, but prevent passage of an infusion bag.

The pivotal member 9 and baffle means 12 are arranged to lie sufficiently close to one another such that the infusible substance (in this case an infusion bag) is substantially prevented from passing through the gap between them. The baffle means 12 is shaped to follow the arc scribed by the distal end of the pivotal member 9 so that their spacing remains substantially constant. The pivotal member 9 is further provided with pins 14 which interlay the bars of the baffle means 12. The pins 14 help to locate the pivotal member 9 and baffle means 12 relative to each other and to prevent the pivotal member 9 from being over flexed. The pivotal member 9 and baffle means 12 are also arranged to cover substantially the entire width of the interior 2 of the container. In this manner, the interior walls of the container, the pivotal member 9 and the baffle means 12 cooperate to define a region 15 in the container which receives the infusible substance and through the entirety of which the pivotal member moves as it pivots.

The pivotal member has a catch 16 which engages a corresponding clip 17 on the lid 6 when the lid is closed and the pivotal member is in its horizontal, operated position. This arrangement retains the pivotal member in its horizontal position without the need for the user to maintain any pressure on the handle 11. The catch is released by opening the lid 6 and the pivotal member 9 is arranged to return under its own weight to its first position once released. The pivotal member 9 thus drops down automatically whenever the lid is opened to ensure that there is maximum space to accommodate the infusible substance and a reduced risk of hot infusing liquid splashing off the pivotal member and out of the container during filling.

The pivotal member could alternatively be retained in its horizontal position by frictional engagement against other parts of the container, for example between the pins 14 and the bars of the baffle means 12.

Figure 3:
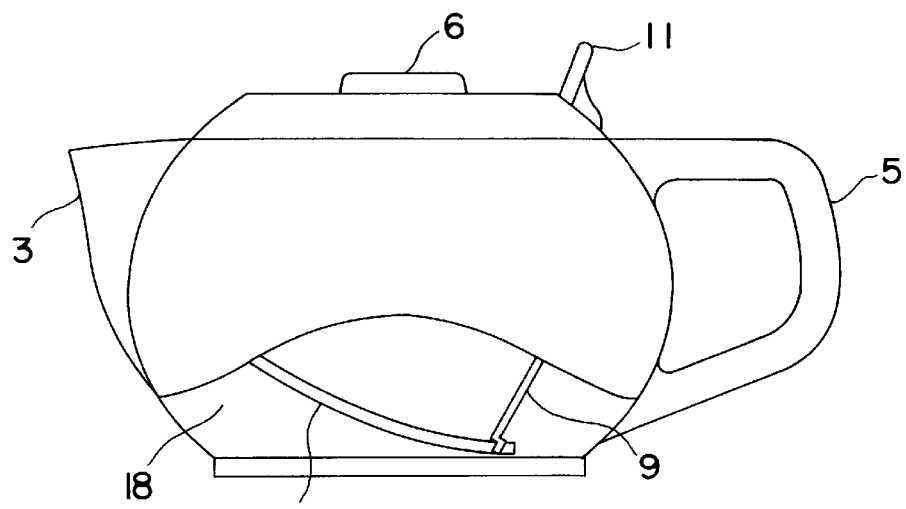
FIG. 3 shows a further side view of the container of the present invention.

FIG. 3 shows a side view of the container 1 of the present invention. It can be seen that a lower portion 18 of the container 1 is transparent. This permits the infusing liquid to be seen throughout infusion, such that a user can readily observe when sufficient infusion has taken place. The transparent portion 18 of the container can be made of any suitable transparent material, such as e.g. amorphous nylon 12 (e.g. TR55 Grilamid from EMS-Chemie of Switzerland), or TPX methyl-pentene copolymer (available from Mitsui & Co UK Ltd). The upper portion of the container 1 can also be made from a polymeric material, such as amorphous nylon which has been pigmented, and the two portions can be welded together.

Figure 4:
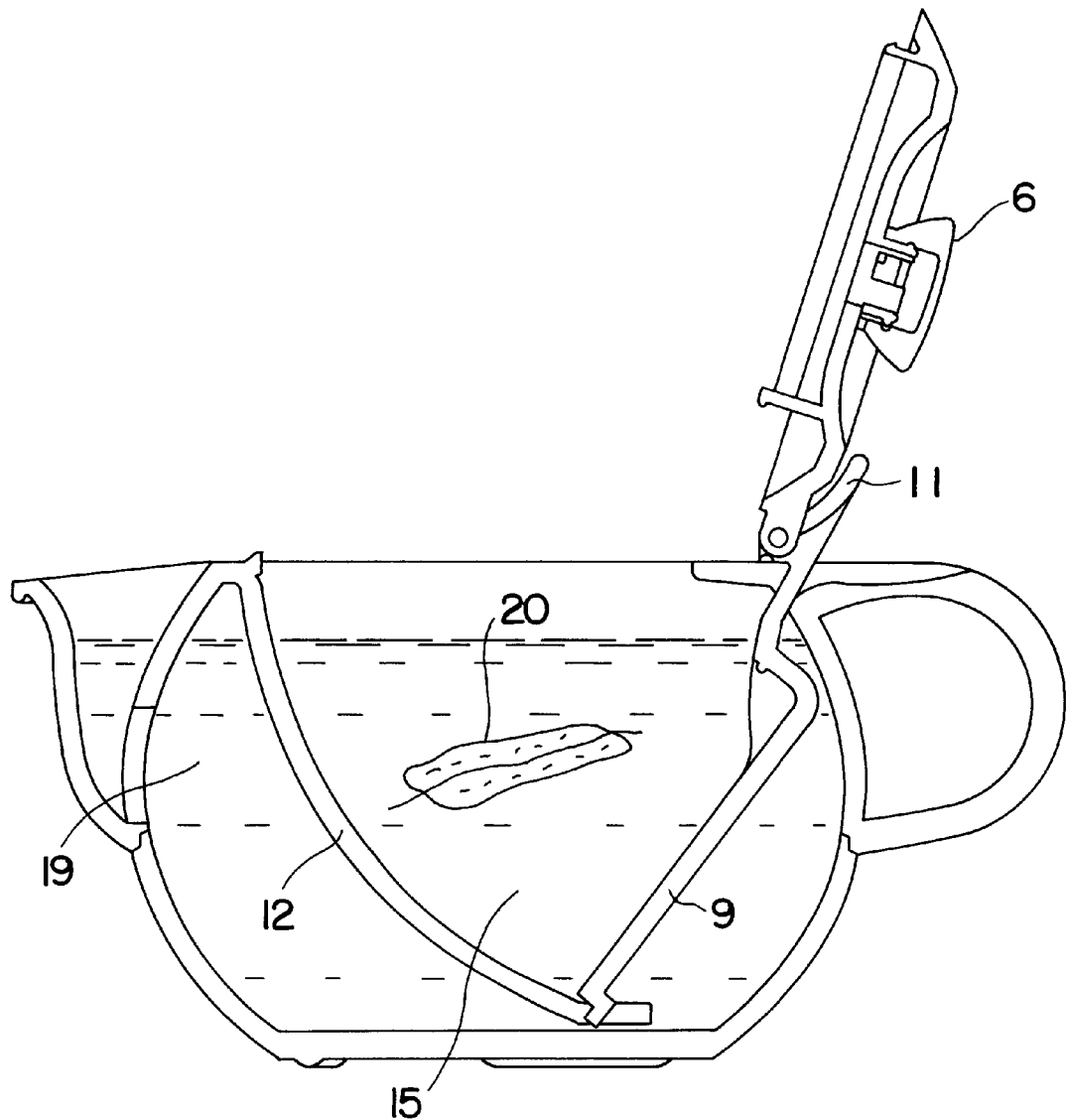
FIGS. 4, 5, 6, 7 and 8 show cross-sectional side views of the container of the present invention in use.

In use, as shown in FIG. 4, the lid 6 of the container is opened (the lid 6 can be arranged to stop against the pivotal member 9 when opened halfway, as shown) and the interior 2 of the container 1 is initially filled with the liquid 19 to be infused. An infusion bag such as a tea bag 20 is added to the infusing liquid in the region 15 defined between the pivotal member 9 and baffle means 12 to commence infusion.

Figure 5:
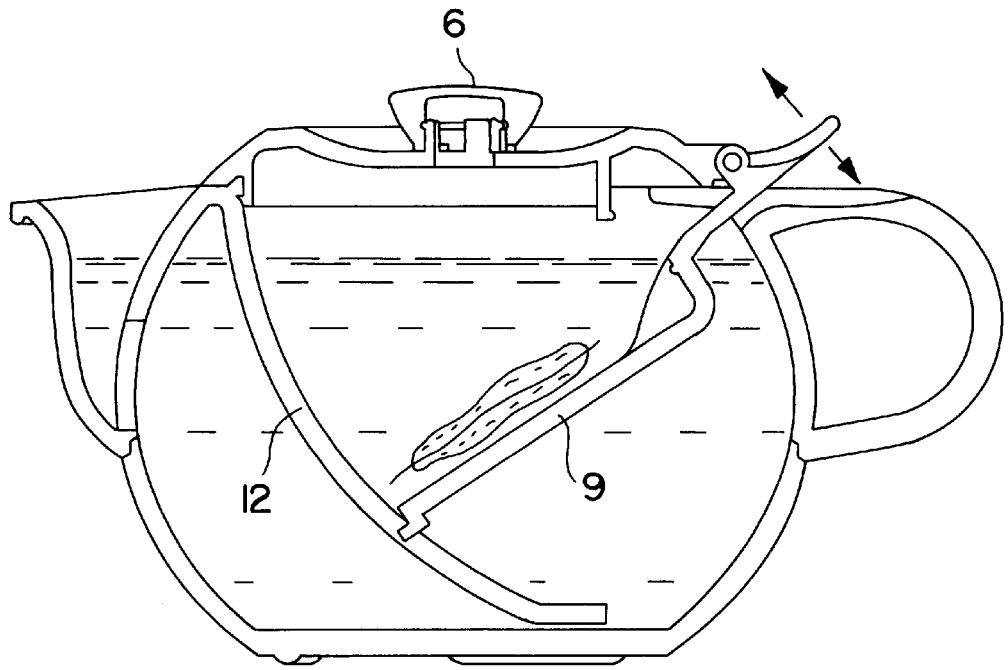

The lid 6 can then be closed without moving the pivotal member 9 whilst infusion takes place (FIG. 5). The pivotal member 9 can be moved slightly as shown to agitate the infusion, if desired.

Figure 6:
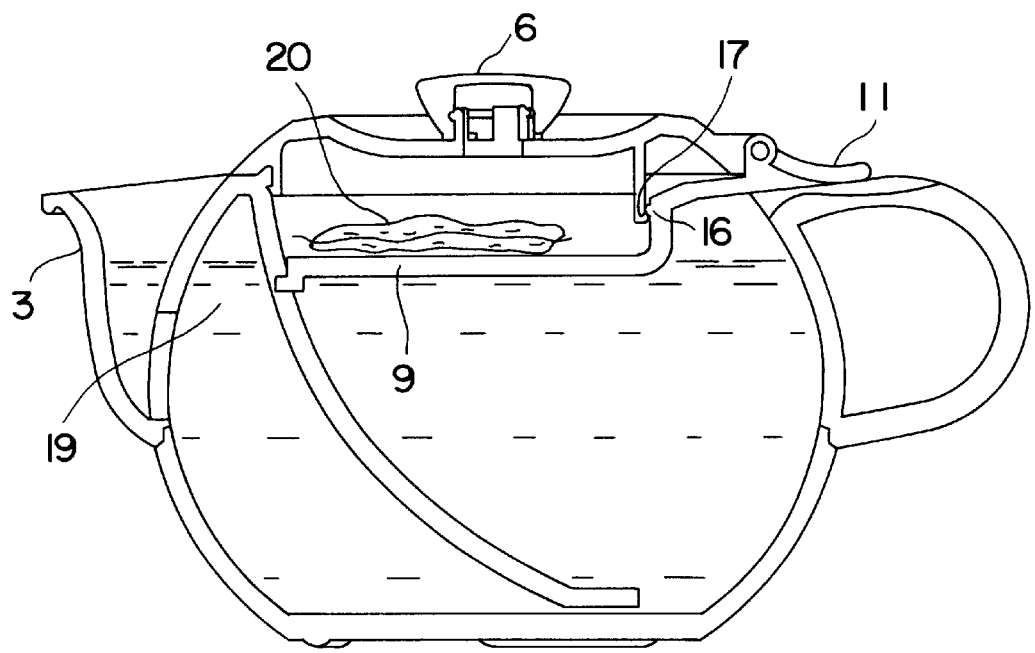

Once the liquid has infused to the desired extent, infusion can be halted as shown in FIG. 6 by the user depressing the handle 11 to pivot the pivotal member 9 to a horizontal position in which it engages the clip 17 on the lid 6 to hold the tea bag 20 above the level of the infusing liquid 19. Infusion is thereby halted and the infused liquid can be dispensed as desired via the spout 3.

The engagement between the catch 16 of the pivotal member and the clip 17 of the lid 6 retains the pivotal member in its horizontal position even under the weight of the wet tea bag 20, such that the user does not need to maintain downward pressure on the handle 11 to keep the infusing process halted.

Figure 7:
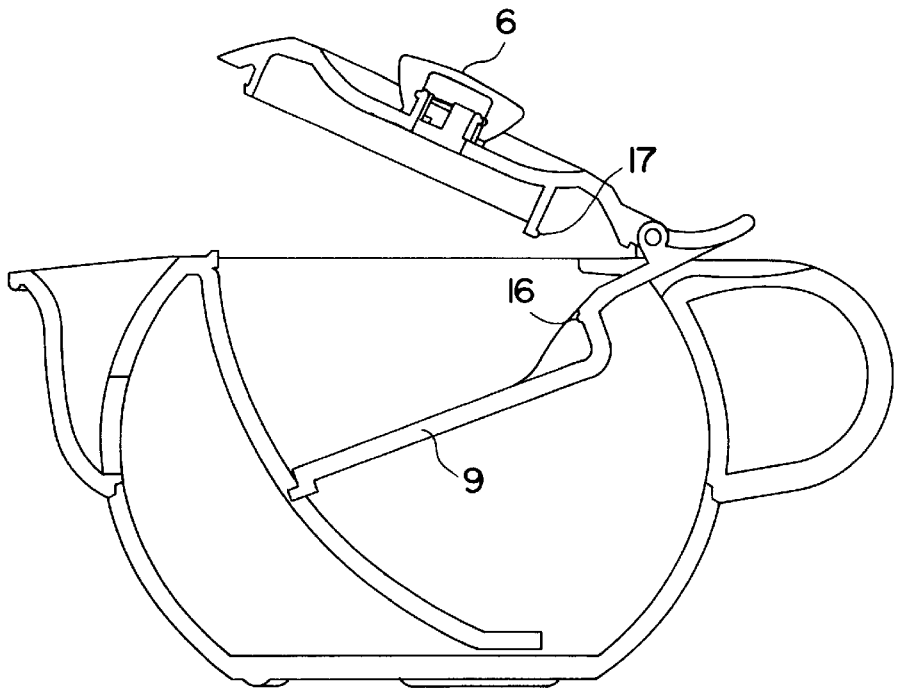

The pivotal member 9 is released by opening the lid 6, and returns to its first position under its own weight (FIG. 7).

Figure 8:
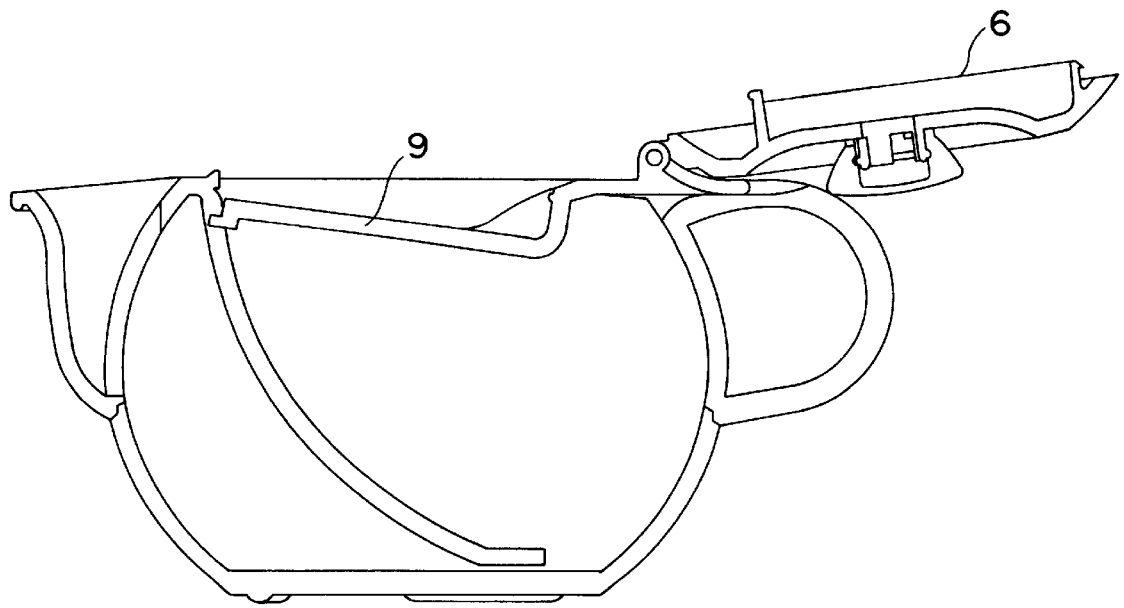

The lid 6 can be fully opened and the pivotal member 9 raised for cleaning purposes as shown in FIG. 8.

Although described with reference to a tea pot and tea bags, the container of the present invention is equally applicable to coffee pots and coffee bags, and furthermore to any other form of infusible substance and infusion container. In the case of tea leaves, for example, the pivotal member 9 and baffle means 12 can comprises fine-meshed sieves which prevent passage of tea leaves. The basic operation of the pivotal member 9 remains exactly the same.

We claim:

1. An infusion container for receiving an infusing liquid and an infusible substance, and having a pivotal member mounted to the container and pivotable by a user to move through at least part of the interior of the container in such a way as to substantially isolate the infusible substance from the infusing liquid, wherein the container has a transparent lower portion which permits observation of the infusing liquid during infusion and an upper portion which is not transparent.

2. An infusion container as claimed in claim 1, wherein the pivotal member is in the form of a paddle having a single pivot near or at one end thereof.

3. An infusion container as claimed in claim 1 wherein the pivotal member has an integral handle, operable by a user to pivot the pivotal member extending externally of the container beyond the pivotal mounting of the pivotal member.

4. An infusion container as claimed in claim 3, wherein the container has a handle, and the handle of the pivotal member is positioned such that both handles can be used simultaneously with the same hand.

5. An infusion container as claimed in claim 1, wherein the pivotal member is arranged to lift the infusible substance out of the infusing liquid when operated to substantially isolate the infusible substance from the infusing liquid.

6. An infusion container as claimed in claim 1, wherein the weight of said pivotal member is distributed so as to cause said pivotal member to pivot to its unoperated position which permits infusion unless operated.

7. An infusion container as claimed in claim 1, wherein the container has a lid, and the weight of said pivotal member is distributed so as to cause said pivotal member to return automatically to its unoperated position ready for use whenever the lid is opened.

8. An infusion container as claimed in claim 1, further comprising a clip arrangement which will retain the pivotal member automatically in its operated position in which the infusible substance is substantially isolated from the infusing liquid once moved to that position by a user.

9. An infusion container as claimed in claim 1, wherein the container has a lid having a clip, and the pivotal member is arranged to engage the clip on the lid of the container when moved to its operated position in which the infusible substance is substantially isolated from the infusing liquid when the lid is closed to retain it in that operated position.

10. An infusion container as claimed 1, wherein the pivotal member is arranged to pivot between a first position in which it depends towards the base of the container to permit infusion and a second, operated position in which it lies substantially horizontally.

11. An infusion container as claimed in claim 1, wherein the transparent portion is made of amorphous nylon or methyl-pentene copolymer.

12. An infusion container for receiving an infusing liquid and an infusible substance, and having a pivotal member mounted to the container and pivotable by a user to move through at least part of the interior of the container in such a way as to substantially isolate the infusible substance from the infusing liquid, wherein the container is provided with a pivotally mounted lid, and the lid and pivotal member are arranged to pivot independently of one another about the same axis and have a common mounting means.

13. An infusion container as claimed in claim 12, wherein the pivotal member is in the form of a paddle having single pivot near or at one end thereof.

14. An infusion container as claimed in claim 12, wherein the pivotal member has an integral handle operable by a user to pivot the pivotal member extending externally of the container beyond the pivotal mounting of the pivotal member, the container has a handle, and the handle of the pivotal member is positioned such that both handles can be used simultaneously with the same hand.

15. An infusion container as claimed in claim 12, wherein the container has a transparent portion which permits observation of the infusing liquid during infusion.

16. An infusion container for receiving an infusing liquid and an infusible substance, and having a pivotal member mounted to the container and pivotable by a user to move through at least part of the interior of the container in such a way as to substantially isolate the infusible substance from the infusing liquid, wherein baffle means is provided within the container which cooperates with the pivotal member to define a region in the container's interior which receives the infusible substance in use, and the pivotal member is moveable through substantially the entirety of said defined region in use.

17. An infusion container as claimed in claim 16, wherein the baffle means is positioned sufficiently close to the pivotal member that the infusible substance cannot pass between them, and is shaped so as to follow the arc traced by the distal end of the pivotal member as it moves within the container when operated.

18. An infusion container as claimed in claim 16, wherein the pivotal member is arranged to pivot between a first position in which it depends towards the base of the container to permit infusion and a second, operated position in which it lies substantially horizontally.

19. An infusion container as claimed in claim 18, wherein the pivotal member substantially isolates the infusible substance from the infusing liquid when in said second position.

20. An infusion container as claimed in claim 19, wherein the weight of said pivotable member is distributed so as to cause said pivotable member to pivot to said first position unless operated.

21. An infusion container as claimed in claim 16, wherein the pivotal member is in the form of a paddle having a single pivot near or at one end thereof.

22. An infusion container as claimed in claim 16, wherein the pivotal member has an integral handle operable by a user to pivot the pivotal member extending externally of the container beyond the pivotal mounting of the pivotal member, the container has a handle, and the handle of the pivotal member is positioned such that both handles can be used simultaneously with the same hand.

23. An infusion container as claimed in claim 16, wherein the container has a transparent portion which permits observation of the infusing liquid during infusion.

24. An infusion container for receiving an infusing liquid and an infusible substance, and having a pivotal member mounted to the container and pivotable by a user to move through at least part of the interior of the container between a first position in which it permits infusion and a second, operated position in which it substantially isolates the infusible substance from the infusing liquid, wherein the container has a lid having a clip, and the pivotal member is arranged to engage the clip on the lid of the container when moved to its second, operated position when the lid is closed to retain it in that operated position, and wherein the clip on the lid of the container is arranged to disengage when the lid is opened such that the pivotal member is released.

25. An infusion container as claimed in claim 24, wherein the pivotal member is in the form of a paddle having a single pivot near or at one end thereof.

26. An infusion container as claimed in claim 24, wherein the pivotal member has an integral handle operable by a user to pivot the pivotal member extending externally of the container beyond the pivotal mounting of the pivotal member, the container has a handle, and the handle of the pivotal member is positioned such that both handles can be used simultaneously with the same hand.

27. An infusion container as claimed in claim 24, wherein the container has a transparent portion which permits observation of the infusing liquid during infusion.

* * * * *